May 18, 1943. W. L. BENEDICT 2,319,199
CATALYTIC TREATMENT OF HYDROCARBONS
Filed May 16, 1941
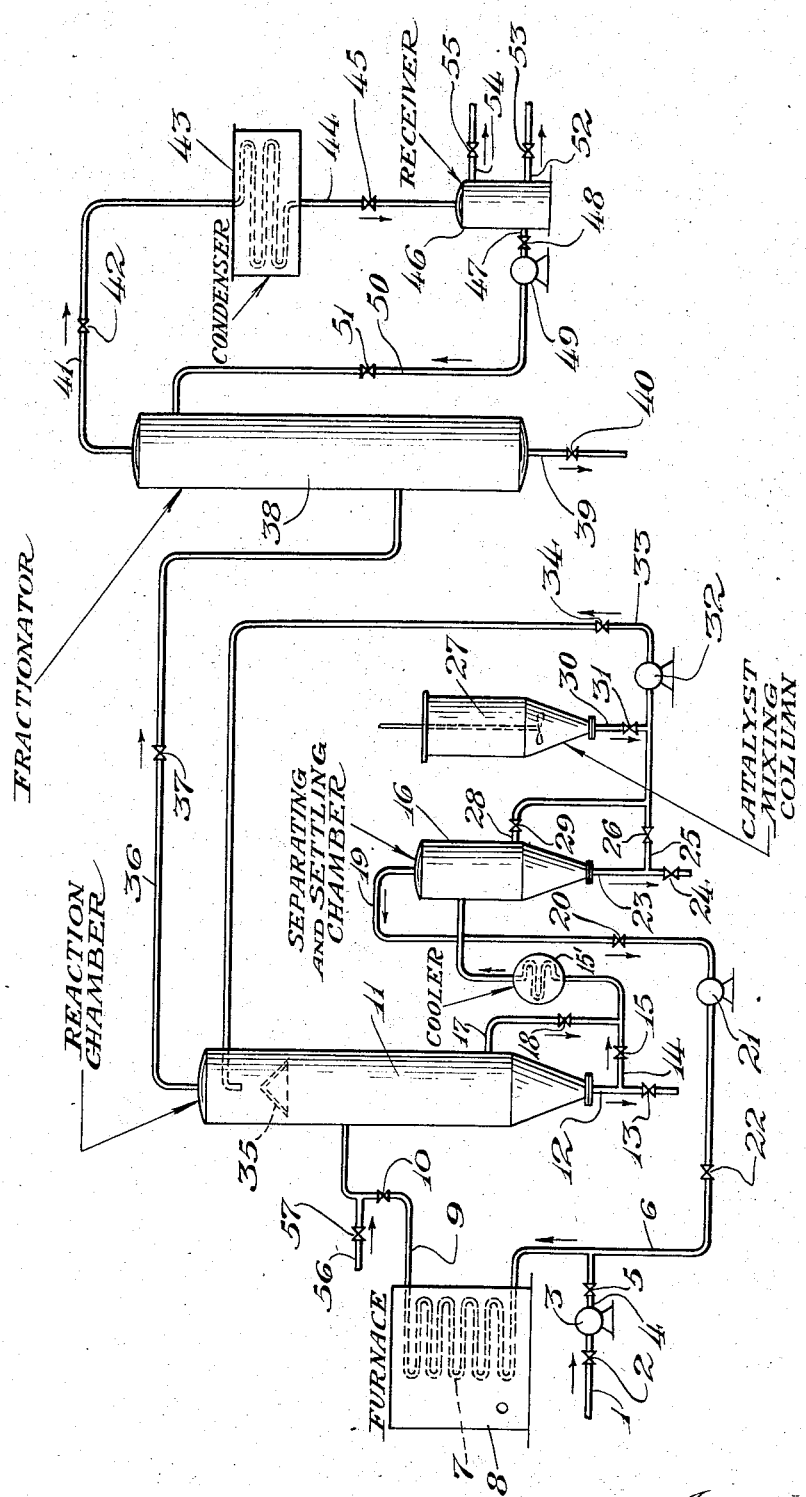
Inventor:
Wayne L. Benedict
By Lee J. Gary
Attorney Patented May 18, 1943

2,319,199

UNITED STATES PATENT OFFICE 2,319,199

CATALYTIC TREATMENT OF HYDROCARBONS

Wayne L. Benedict, Chicago, Ill., assignor to Universal Oil Products Company, Chicago, Ill., a corporation of Delaware Application May 16, 1941, Serial No. 393,704

4 Claims. (Cl. 196—54)

This invention relates to the treatment of hydrocarbon oils in the presence of catalysts to produce high antiknock gasoline. More specifically it is directed to the more effective utilization of catalysts of the aluminum chloride type in cracking and reforming reactions and to more suitable contact conditions of the catalyst and oil undergoing conversion treatment.

It is generally known that a relatively saturated gasoline of high octane number having good lead susceptibility is obtained in the aluminum chloride type of conversion of hydrocarbon oils. It is also known that the hydrocarbon gases from the process contain relatively large amounts of isobutane which is particularly valuable in the manufacture of alkylated hydrocarbons useful in aviation fuels. It is among the objects of the present invention to obtain increased yields of the high antiknock saturated gasoline, isobutane and other valuable products in the aluminum chloride cracking process.

In one specific embodiment, the present invention comprises commingling the hydrocarbon oil charging stock with a relatively clean, partially reacted oil from the process and heating the commingled oil to catalytic cracking conditions, directing the heated commingled oil into a reaction chamber and cracking catalytically while essentially in the liquid phase, adding aluminum chloride catalyst and hydrogen chloride thereto, withdrawing partially reacted oil containing aluminum chloride sludge to a settling chamber to separate relatively clean, partially reacted oil from an oil and catalyst sludge mixture, returning the relatively clean, partially reacted oil to further treatment commingled with hydrocarbon charging oil as hereinabove set forth, withdrawing a portion of the separated oil and aluminum chloride sludge mixture from the process, mixing the remaining portion with fresh catalyst and adding to the oil as hereinabove set forth, removing vaporous reaction products from the reaction chamber and fractionating the vapors to separate gasoline boiling range hydrocarbons and cracked gases from higher boiling hydrocarbons, cooling and separating the gasoline boiling range hydrocarbons from gases containing isobutane and hydrogen chloride.

In a further embodiment, the higher boiling hydrocarbons separated from the gasoline boiling range hydrocarbons are heated and reacted in mixture with the oil undergoing said catalytic cracking treatment and the gases from the process are subjected to separation treatment to recover hydrogen chloride and the recovered hydrogen chloride is returned to the process.

According to the process of the present invention, a hydrocarbon oil such as a gas oil or kerosene fraction, or a gasoline boiling range fraction having low antiknock value, is processed in the presence of a metal halide cracking catalyst under cracking conditions adapted to prevent or minimize the formation of coke in the reaction chamber by maintaining a circulation of the oil undergoing conversion treatment. The oil and catalyst mixture from conversion treatment is removed to a separating and settling chamber where relatively clean oil is essentially separated from oil containing aluminum chloride complex. The relatively clean oil is withdrawn and after mixing with fresh charging oil is heated to a catalytic conversion temperature and directed to the reaction chamber. The oil containing the catalyst complex, particularly the heavier sludge portion thereof, is removed from the process while partially reacted hydrocarbon oil containing in suspension partially spent catalyst is mixed with fresh catalyst and is then directed to the reaction chamber preferably without preheating. A static condition in the reaction chamber is thus avoided in which a heavy coke-forming sludge adheres to the sides of the reaction vessel. The oil is withdrawn from the reaction zone and is cooled to a temperature at which substantially no reaction takes place and where the oil and catalyst sludge can be readily segregated. The sludge is catalytic in nature and in order to obtain the maximum utility therefrom should be recirculated to the process. According to the present invention this can be done without the necessity for heating it by passing it through heated coils or in contact with other externally heated surfaces whereby the tendency for the sludge to deposit coke-like materials is enhanced. If aluminum chloride sludge is heated in the absence of charging stock it is reduced to a material of heavier and more viscous character. If it is heated while mixed with charging stock with which it is not completely miscible there is a tendency for the heavy sludge to deposit on the heated surfaces and to be reduced to solid or semi-solid material. This may result in the ultimate coking up of the heating surfaces, thereby reducing the heat transfer to the reactants and moreover resulting in loss of valuable catalytic material.

The present invention permits recirculation of sludge while at the same time carrying out the process in an efficient manner at the desired temperature. The temperature is attained by heating the catalyst-free oil to a temperature sufficiently above that desired in the reactor so that the temperature in the reaction zone is brought to the desired point when the oil and catalyst are mixed therein. The catalyst is in the form of a fluid sludge but during the time in which it is being pumped outside of the reaction zone it is at a temperature wherein the reaction velocity is so slight that the undesirable effects referred to above are negligible. As a result of this process the conversion reaction is increased, the activity of the catalyst is more effectively realized, and the ultimate life of the catalyst is prolonged. Furthermore, the on-stream time of the plant is materially increased since the undesirable coking effects referred to are reduced to a minimum.

Hydrogen chloride is utilized in this process to facilitate the conversion reaction in conjunction with the aluminum chloride catalyst. The hydrogen chloride is added, preferably in anhydrous form, and may be added either to the oil undergoing cracking after heat treatment or may be added to the sludge being recirculated or it may be added directly to the reaction zone. The quantity of hydrogen chloride is comparatively small and there is little or no consumption in the process. As a consequence it may be recovered from the final reaction products and recirculated.

The reactions involved in aluminum chloride cracking are generally known. There is a severing of carbon-to-carbon bonds, particularly with higher boiling hydrocarbons to form lower boiling hydrocarbons. There is also a decyclization of naphthenes and an isomerization of straight chain hydrocarbons to form more highly branched compounds therefrom. In the present process there appears to be less of the polymerization reactions in which there is formation of lower layer with the metal halide catalysts.

This may be because the catalytic sludge formed is never heated above the optimum temperature for conducting the reaction and it is never brought into contact with an externally heated surface.

Desulfurization reactions may occur, resulting in reduction or elimination of sulfur from the products.

The operating conditions may be varied over a wide range depending upon the charging stocks, the amount of catalyst, the metal halide chosen, and other features such as the products desired and their quality. For example, the temperature may be within a range of about 400 to about 700° F. Pressures may vary widely from substantially atmospheric to 500 pounds or more per square inch. The quantity of catalyst present in the system at any one time may vary considerably from less than one per cent to approximately ten per cent of the oil processed. In certain instances, when employing aluminum chloride even larger quantities may be present in the apparatus but the ultimate consumption of aluminum chloride is usually less than one or two per cent by weight of the oil converted. The amount of hydrogen chloride circulated is normally less than five per cent by weight of aluminum chloride employed.

The features of the invention will become more apparent in the description of the flow and operating conditions described in connection with the attached drawing. The drawing illustrates diagrammatically and in conventional side elevation one specific form of apparatus which may be used to accomplish the objects of the invention. It is not drawn to any exact or relative scale and serves only as an illustration of the process constituting the invention.

Referring to the drawing, a clean hydrocarbon oil such as a light topped crude oil, or preferably a hydrocarbon oil fraction such as a gas oil, a kerosene distillate or a fraction boiling within the gasoline boiling range having a low antiknock value, is charged to the process through line 1 regulated by valve 2 leading to pump 3 which pumps this oil through line 4 containing valve 5 into line 6 and mixing with partially reacted oil which mixture then flows to the heating element 7 located in furnace 8. The oil is heated to a catalytic reaction temperature and directed through line 9 regulated by valve 10 to an intermediate point in the height of the reaction chamber 11 where it is mixed with the catalyst and is reacted as subsequently described. Hydrogen chloride is preferably added to the oil to aid the aluminum chloride cracking and may be introduced through line 56 regulated by valve 57 into the heated oil flowing through line 9 into the reaction chamber. Partially reacted oil containing catalyst complex and catalyst sludge is removed from the lower part of reaction chamber 11 through line 12 and may under some conditions be removed through valve 13 as will be subsequently described. In most operations, however, the mixture of oil and catalyst is removed from line 12 through line 14 containing valve 15 and cooler 15' and is directed to the separating and settling chamber 16 for separation of a relatively clean hydrocarbon oil fraction from oil containing the catalyst complex and catalyst sludge. In the case of the cracking of heavier oils, such as gas oil in the presence of aluminum chloride catalyst, it may be desirable to permit the settling of a relatively heavy sludge in the bottom of the reaction chamber 11 which is then removed through line 12 and valve 13 while the circulation of oil through the chamber is maintained by removing oil at a higher level as illustrated by withdrawing the oil through line 17 regulated by valve 18 and admitting this oil to line 14 through which it flows to chamber 16 for separation as has been described. Relatively clean oil, more or less free from catalyst, is removed from the top of separating chamber 16 through line 19 containing valve 20 and flows to pump 21 which pumps this oil through line 6 containing valve 22 where it mixes with charging oil and is then admitted to the heating element for treatment as has been hereinabove set forth.

Hydrocarbon oil settling out in chamber 16 and containing aluminum chloride complex and sludge, is removed from the lower part thereof through line 23 and may be withdrawn in part from the process through valve 24 for separation and recovery treatment to recover oil and aluminum chloride therefrom. The major portion of the settled oil and catalyst material however flows from line 23 into line 25 containing valve 26. Aluminum halide catalysts may be added thereto from the catalyst mixing column 27 by any convenient means through line 30 and valve 31. In some cases, particularly where a heavy sludge is separated in chamber 16, the heavy sludge may be withdrawn through line 23 and valve 24 and the oil containing partially consumed catalyst withdrawn at a higher level as illustrated by withdrawing this oil and catalyst suspension through line 28 regulated by valve 29 leading into line 25. The catalyst mixture is pumped by pump 32 through line 33 containing valve 34 to the distributing means in the reaction zone illustrated as 35 in the upper portion of reaction chamber 11. This distributing means may, for example, consist of a perforated ring or a conical baffle plate.

Gasoline containing vapors and gases are removed from the upper part of the reaction chamber 11 through line 36 regulated by valve 37 and leading to fractionator 38 where gasoline boiling range hydrocarbons and gases are separated from higher boiling hydrocarbons. The higher boiling hydrocarbons are removed from the lower part of fractionator 38 through line 39 regulated by valve 40 and may then be removed from the process or subjected to further catalytic conversion treatment by means not shown, as for example by mixing with the oil flowing through line 6 for heating and cracking treatment. Gasoline containing vapors and gases are removed from the fractionator 38 through line 41 containing valve 42 leading to the condenser 43 where these products are cooled and condensed. The cooled and condensed products are then directed through line 44 containing valve 45 into the receiver 46 where the gasoline boiling range hydrocarbons are separated from gaseous products. A portion of the gasoline boiling range hydrocarbons collected in the lower portion of receiver 46 are removed through line 47 containing valve 48 and leading to pump 49 which pumps this oil through line 50 containing valve 51 to the upper part of the fractionator 38 for the purpose of assisting in the regulation of the end boiling temperature of the gasoline product. Gasoline boiling range hydrocarbons are withdrawn from receiver 46 through line 52 regulated by valve 53 and gaseous products are removed through line 54 regulated by valve 55. The gases thus removed contain isobutane, other valuable hydrocarbons and also hydrogen chloride which is preferably recovered by conventional means not shown and returned to the process together with the fresh hydrogen chloride admitted thereto through line 56 regulated by valve 57.

The following specific example is given to illustrate a specific application of the process of the invention. The invention should not be considered as limited to this example or to the particular catalyst used since these are given to illustrate the utility of the invention.

A 36° A. P. I. Pennsylvania gas oil is heated to a temperature of approximately 650° F. at a pressure of approximately 200 pounds per square inch and is then directed into a reaction chamber where it is mixed with approximately 5 per cent by weight of anhydrous aluminum chloride and one-fourth of one per cent of hydrogen chloride. Catalytic cracking occurs in the reaction chamber and oil and partly used catalyst is withdrawn from the lower part of the reaction chamber. Partially cracked oil approximately equal in amount to the gas oil charged to the process is separated from oil having concentrated therein the partly used catalyst and catalyst sludge, and is returned to the process together with the gas oil charge. The oil containing the partly used catalyst and sludge is settled to separate the heavy catalyst sludge in the oil which is removed from the process while the oil and partly used catalyst is mixed with fresh catalyst and is then returned to the process for contacting with the oil to be cracked. Gasoline containing vapors from the chamber are fractionated to separate the desired gasoline product. The 400° F. end-point gasoline has an octane number of 75, is highly saturated and corresponds to a yield of approximately 50 per cent based on the gas oil charged to the process.

I claim as my invention:

1. A conversion process which comprises cracking hydrocarbon oil while in admixture with a metal halide catalyst in a vertical reaction zone, removing admixed oil and catalyst from the lower portion of the reaction zone and separating from the mixture a relatively clean oil and a liquid containing suspended catalyst, adding charging oil for the process to said relatively clean oil and heating the commingled oils to cracking temperature, introducing the heated oils to the reaction zone at an intermediate point in the height thereof, adding fresh metal halide catalyst to said liquid containing suspended catalyst, introducing the resultant mixture to the upper portion of the reaction zone above said intermediate point, removing vapors from the upper portion of the reaction zone and subjecting the same to fractionation and condensation.

2. The process as defined in claim 1 further characterized in that the catalyst comprises aluminum chloride.

3. The process as defined in claim 1 further characterized in that a hydrogen halide is introduced to the reaction zone together with said heated oils.

4. The process as defined in claim 1 further characterized in that the catalyst comprises aluminum chloride and in that hydrogen chloride is introduced to the reaction zone together with said heated oils.

WAYNE L. BENEDICT.